United States Patent
Patel et al.

(10) Patent No.: US 9,413,485 B2
(45) Date of Patent: Aug. 9, 2016

(54) NETWORK FOLLOWED BY COMPUTE LOAD BALANCING PROCEDURE FOR EMBEDDING CLOUD SERVICES IN SOFTWARE-DEFINED FLEXIBLE-GRID OPTICAL TRANSPORT NETWORKS

(71) Applicant: NEC Laboratories America, Inc., Princeton, NJ (US)

(72) Inventors: Ankitkumar Patel, Plainsboro, NJ (US); Philip Ji, Cranbury, NJ (US); Ting Wang, West Windsor, NJ (US)

(73) Assignee: NEC Corporation (JP)

(*) Notice: Subject to any disclaimer, the term of this patent is extended or adjusted under 35 U.S.C. 154(b) by 172 days.

(21) Appl. No.: 14/312,610

(22) Filed: Jun. 23, 2014

(65) Prior Publication Data

US 2014/0379927 A1   Dec. 25, 2014

Related U.S. Application Data

(60) Provisional application No. 61/838,479, filed on Jun. 24, 2013.

(51) Int. Cl.
*G06F 15/173* (2006.01)
*H04J 14/02* (2006.01)
*H04L 29/08* (2006.01)
*H04L 12/24* (2006.01)
*G06F 9/46* (2006.01)

(52) U.S. Cl.
CPC ............... *H04J 14/0227* (2013.01); *G06F 9/46* (2013.01); *H04L 41/0896* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 9,160,477 B2* | 10/2015 | Patel | H04J 14/021 |
| 9,197,350 B2* | 11/2015 | Zhang | H04J 14/0257 |
| 2014/0099118 A1* | 4/2014 | Zhang | H04J 14/0257 398/79 |
| 2014/0099119 A1* | 4/2014 | Wei | H04J 14/0257 398/79 |

* cited by examiner

Primary Examiner — John B Walsh
(74) Attorney, Agent, or Firm — Joseph Kolodka

(57) ABSTRACT

A method for solving a cloud embedding problem includes first mapping virtual links over physical links followed by virtual nodes over physical nodes. The inventive method entails an efficient procedure, namely network followed by compute load balancing (NCLB), that first maps virtual links over physical links while balancing network resources, and finally, maps virtual nodes over physical nodes while balancing different types of computational resources.

9 Claims, 3 Drawing Sheets

NETWORK FOLLOWED BY COMPUTE LOAD BALANCING PROCEDURE FOR EMBEDDING CLOUD SERVICES IN SOFTWARE-DEFINED FLEXIBLE-GRID OPTICAL TRANSPORT NETWORKS

RELATED APPLICATION INFORMATION

This application claims priority to provisional application No. 61/838,479 filed Jun. 24, 2013, the contents thereof are incorporated herein by reference, This application is related to U.S. patent application Ser. No. 14/312,603, entitled "Compute Followed by Network Load Balancing Procedure for Embedding Cloud Services in Software-Defined Flexible-Grid Optical Transport Networks", filed Jun. 23, 2014.

BACKGROUND OF THE INVENTION

The present invention relates generally to optical communications, and more particularly, to a network followed by compute load balancing procedure for embedding cloud services in software-defined flexible-grid optical transport networks.

Software-Defined Network (SDN) architecture enables network programmability to support multi-vendor, multi-technology, multi-layer communications, and to offer an infrastructure as a service. Recently, efforts are going on to integrate optical transport within IP/Ethernet-based SDN architecture to leverage optical transmission benefits, such as low interference, long reach and high capacity transmission with lower power consumption. Such a network is referred to as Optical Transport SDN Optical transport SDN can be realized by enabling flexibility and programmability in transmission and switching network elements, such as transponders and ROADMs, management of optical channels, such as flexible-grid channel mapping, and extracting control plane intelligence from the physical hardware to the centralized controller.

FIG. 1 shows architecture for optical transport SDN in which control plane is abstracted from physical hardware of network elements and most network control and management intelligence now resides into a centralized controller. The centralized controller controls network elements using a standardized protocol, such as OpenFlow over standardized interfaces at controller and network elements. The control plane decisions present in the form of rules, actions, and policies, and network elements applies these decision based on match-action on connections. Thus, optical transport SDN partitions a network into software defined optics (SDO) and optics defined controller (ODC).

Software-defined optics consists of variable rate transponders, flexible-grid channel mapping, and colorless-directionless-contentionless-gridless (CDCG) ROADMs. Variable-rate transponder can be programmed for various modulation formats and FEC coding. Thus, transponders can offer variable transmission capacity for heterogeneous reach requirements. Flexible-grid channel mapping allows an assignment of flexible amount of spectrum to channels to achieve higher spectral efficiency by applying spectrum-efficient modulation formats and eliminating guard bands. CDCG-ROADM can be programmed to switch connections operating on any wavelength with any spectral requirement over any outgoing direction. Furthermore, connections can be added and dropped at a node without contentions. These hardware and their features establishes foundation of SDON optimization and customization capabilities.

Optics defining controller manages the network, and performs network optimization and customization to utilize flexibility of SDO, ODC functionalities are further extracted into network/compute hypervisor, operating system, network applications and database, and debugger and management planes. These planes are isolated by open standardized interfaces to allow simultaneous and rapid innovations at each layer independently. Various control plane functionalities, for example, cloud resource mapping, routing and resource allocation, protection and restoration, defragmentation, energy optimization, etc., are installed as applications and data base in the ODC. Network/compute hypervisor offers virtualization by providing isolation and sharing functions to a data plane as well as an abstract view of network and computing resources while hiding physical layer implementation details to a controller in order to optimize and simplify the network operations. Operating system offers a programmable platform for the execution of applications and hypervisors. Debugger and management plane offers access control and QoS management, while monitoring network performance, and performs fault isolation, localization, and recovery.

Recently, cloud services have gained a lot of interests since it supports applications by sharing resources within existing deployed infrastructure instead of building new ones from scratch. These days network applications are becoming more and more cloud centric, for example social networking applications, such as FaceBook, Twitter, and Google+, e-science applications, such as Large Hadron Collider, content applications, such as NetFlix, and search applications, such as Google and Baidu. Cloud applications are supported by interconnecting various computing, storage, software, and platform-oriented resources within data centers through networks. Each data center is built with the goal of optimizing the type of services offered, for example Google data center is built with the goal of efficient indexing of web pages and minimization of content search time, while Facebook data center is built to offer maximum storage for user contents and efficient management and linking of these contents within user's social group. Amazon EC2 data center is built to offer faster computing time. Thus, one data center may not provide all types of resource, and may not optimally meet all the requirements of a cloud application. In such scenarios, open challenges are how to map a cloud request among data centers offering heterogeneous resources, and how to establish network connectivity between data centers. The problem is referred to as cloud service embedding problem. In this invention, we investigate cloud service embedding problem over software-defined flexible grid transport SDN networks. The problem is formally defined as follow.

We are given a physical network topology G(N, L), where N represents a set of physical nodes (PNs) and L represents a set of physical links (PLs) interconnecting physical nodes. Each node offers different types resources, for example, 1, 2, 3, ..., n, and the number of offered resources $C_j^n$ for each type j is given in advance. A node also consists of CDCG-ROADMs and variable rate transponders. CDCG-ROADM offers switching of flex-grid optical connections while variable rate transponders offer a set of modulation formats M, where the spectral efficiency $Z_m$ bit/second/Hz and transmission reach $D_m$ Km of each modulation format m is also given. A fiber offers total T THz of spectrum. A cloud demand is defined as G'(V, E, C, L), where V is a set of virtual nodes (VNs), E is a set of virtual links (VLs) connecting virtual nodes. C is a set of requested resources $(C_i^1, C_i^2, \ldots, C_i^n)$ at each virtual node i, L is a set of requested line rate $l_{ij}$ between virtual nodes i and j. The arrival and departure distributions of cloud requests are given. The problem is how to map virtual nodes of a cloud demand over physical nodes (the virtual node embedding problem) and virtual links of a cloud demand over physical links (the virtual link embedding problem), such that the number of embedded cloud demands is maximized. Virtual link embedding problem consists of sub-problems such as how to route a virtual link over physical routes, how to assign a wavelength and allocate spectrum, and how to select a modulation format. It is assumed that a network does not support wavelength, spectrum, or modulation format conversion capability.

Cloud embedding mainly consists of virtual node embedding and virtual link embedding. Since physical node and link resources are shared among multiple could demands, an embedding procedure needs to ensure isolation of these resources while maintaining the resource capacity constraints. When mapping virtual nodes over physical nodes, a procedure needs to ensure that different virtual nodes cannot be mapped over the same physical node. When mapping virtual links over physical routes through optical channels in flex-grid transport SDN, a procedure needs to ensure the wavelength continuity, and spectral continuity, spectral conflict. The wavelength continuity constraint is defined as an allocation of spectrum at the same operating wavelength on all links along the route of an optical channel. The spectral continuity constraint is defined as an allocation of the same amount of spectrum on all links along the route of an optical channel. The spectral conflict constraint is defined as an allocation of non-overlapping spectrum to all channels routed through the same fiber. Furthermore, a procedure also needs to make sure that a selection of modulation format for a virtual link and its routing over the network should support at least the physical Euclidean distance between the physical nodes on which virtual nodes are mapped. The constraint is referred to as the reachability constraint.

Cloud service embedding consists of virtual node embedding and virtual link embedding sub-problems. If the virtual nodes are per-assigned to physical nodes, then the problem of just mapping virtual links over physical links is referred to as virtual network embedding problem. The virtual network embedding problems have been extensively solved for IP/Ethernet-based networks while ignoring optical transport.

However, there is a need for optimizing the cloud service embedding problem with a procedure that embeds a maximum number of cloud demands, and thus, reduces the cloud demand blocking.

BRIEF SUMMARY OF THE INVENTION

The present invention is directed to a method including, implementing by a computer an embedding of cloud demands over a software defined flexible grid optical transport network, initially mapping virtual links over physical links in the network, finding potential modulation formats and routing solutions for a virtual link mapping, selecting a modulation format and a physical routing solution for a virtual link based on a probability of mapping the virtual link over the route using the modulation format, assigning a wavelength and allocation spectrum to a virtual link such that spectral fragmentation is minimized thereby improving likelihood of mapping virtual links over physical routes, and mapping virtual nodes over physical nodes which includes assigning virtual nodes associated with the mapped virtual link to the end of physical nodes of a selected route on which the virtual link is mapped.

In an alternative embodiment of the invention, a system includes, implementation by a computer an embedding of cloud demands over a software defined flexible grid optical transport network, the implementation includes initially mapping virtual links over physical links in the network, finding potential modulation formats and routing solutions for a virtual link mapping, selecting a modulation format and a physical routing solution for a virtual link based on a probability of mapping the virtual link over the route using the modulation format, assigning a wavelength and allocation spectrum to a virtual link such that spectral fragmentation is minimized thereby improving likelihood of mapping virtual links over physical routes, and mapping virtual nodes over physical nodes which includes assigning virtual nodes associated with the mapped virtual link to the end of physical nodes of a selected route on which the virtual link is mapped.

These and other advantages of the invention will be apparent to those of ordinary skill in the art by reference to the following detailed description and the accompanying drawings.

DETAILED DESCRIPTION

Figure 1:
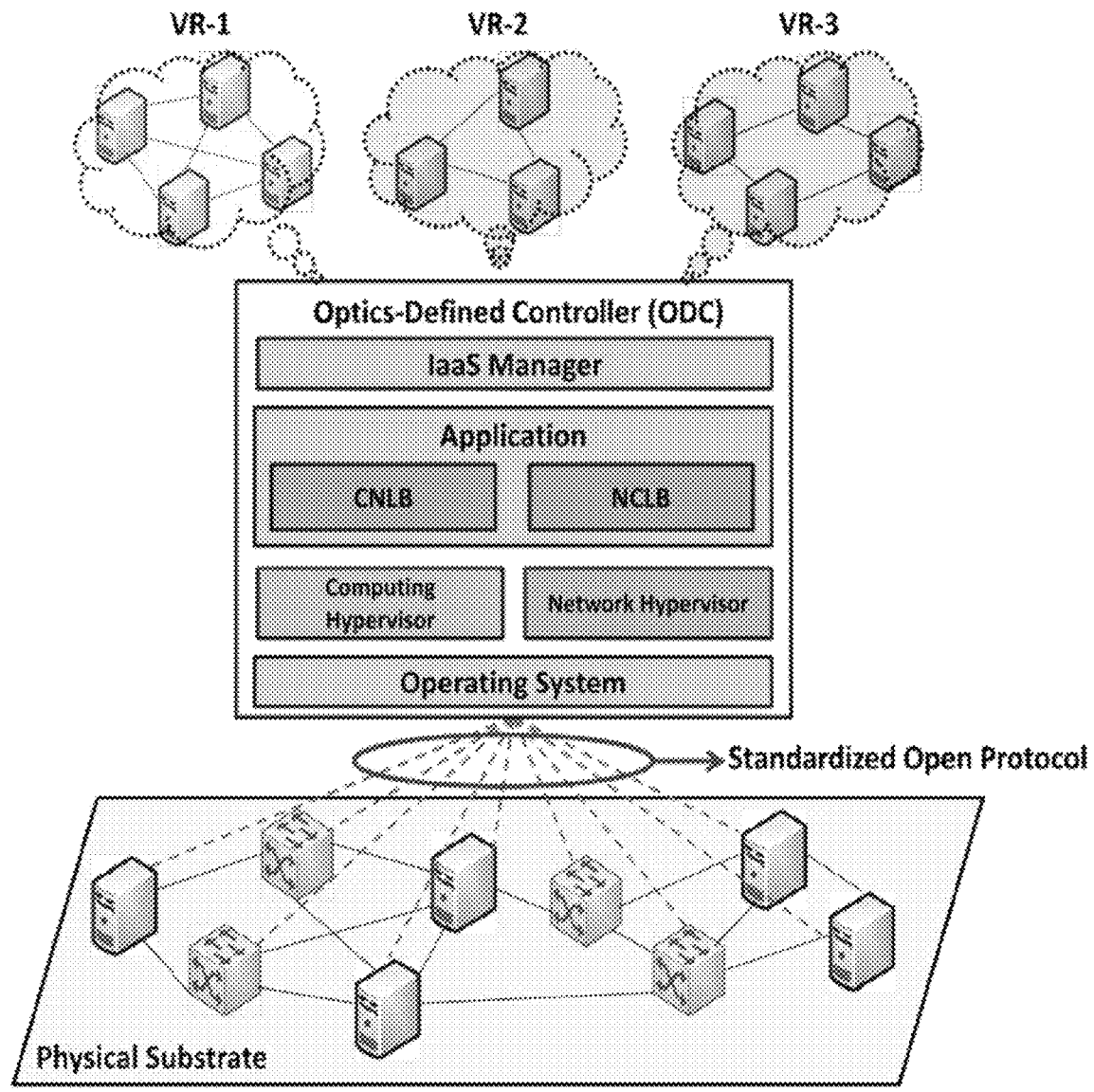
FIG. 1 is an diagram of an exemplary architecture of an optical transport software defined network SDN.

The present invention is directed to solving the cloud embedding problem by first mapping virtual links over physical links followed by virtual nodes over physical nodes. The present invention entails an efficient procedure, namely network followed by compute load balancing (NCLB), that first maps virtual links over physical links while balancing network resources, and finally, maps virtual nodes over physical nodes while balancing different types of computational resources. To the best of our knowledge, this is the first invention that solves the cloud embedding problem by first mapping virtual links over physical links followed by virtual nodes over physical nodes.

To reduce the management complexity, the spectrum is slotted at the granularity of q GHz. A slot is referred to as a wavelength slot. Thus, spectrum can be represented by a set of consecutive wavelength slots, and among them, the first wavelength slot index is denoted as the wavelength of an optical channel. Thus, the network consists of total ceiling (T/q) wavelength slots [Note: ceiling(.) and floor(.) indicate ceiling and floor mathematical operations respectively over the value confined within a bracket]. The state of each wavelength slot is represented by a binary variable; '1' indicated that the wavelength slot is available and '0' indicates that the wavelength slot is occupied. The spectrum state of a fiber is represented by a binary vector that is referred to as a bit-map of a fiber.

The procedure pre-calculates up to k-shortest routes between each pair of nodes, where $k \leq |N|$. The procedure first maps virtual links (VLs) over physical links (PLs) while performing load balancing over network resources. The procedure first arranges the VLs of the cloud demand in a descending order of the requested line rates. A VL is selected from this ordered list one-by-one and mapped on the physical network. For the picked VL, the procedure finds a set of PNs $G_j$ for each unmapped VN j of the VL such that all PNs within a set has at least the required number of each type of resources requested by the VN j. If the set $G_j$ of any unmapped VN j is empty, then the procedure cannot map VN over any of the PNs, and blocks the cloud demand. On the other hand, if the sets $G_j$ of all unmapped VNs j are non-empty, then the procedure performs specific actions based on how many VNs of the selected VL are unmapped. If both the VNs of the selected VL are unmapped, then the procedure considers potential mapping of the VL over k-shortest routes connecting each combination of physical nodes (r, t), where r∈$G_i$ and t∈$G_j$, r≠t, and finds a potential set of modulation formats $M_{rt}^k$ for each of the potential mapping on route k between physical nodes r and t based on the reachability constraint. On the other hand, if one of the VNs is already mapped to some of the PN, and the remaining VN is not yet mapped, then the procedure considers potential mapping of the VL over k-shortest routes connecting each combination of physical nodes (r, t) where r is the already mapped VN and t∈$G_j$ is the unmapped VN, where r≠t, and finds a potential set of modulation formats $M_{rt}^k$ for each of the potential mapping on route k between physical nodes r and t based on the reachability constraint. On the other hand, if both of the VNs of the VL are already mapped, then the procedure considers potential mapping of the VL over k-shortest routes between nodes (r, t), where VNs i and j are already mapped to PNs r and t, and finds a potential set of modulation formats $M_{rt}^k$ based on the reachability constraint. In the next step, the procedure finds a bit-map of each of the k-shortest potential routes connecting each combination of physical nodes (r, t). A bit-map of a route is determined by performing bit-wise logical end operations on the bit-maps of all physical links along the route. The procedure also determines the required spectrum $S_{rt}^{km}$=Ceiling ($l_{ij}/Z_m$) for each modulation format m∈$M_{rt}^k$. In the next step, the procedure finds the probability of mapping the VL over a potential route k connecting PNs r and t using modulation format m∈$M_{rt}^k$, denoted as $P_{rt}^{km}$. $P_{rt}^{km}$ is the ratio of the number of wavelength slots starting from which ceiling($S_{rt}^{km}/q$) consecutive wavelength slots are available for a modulation format m on the bit-map of a route k to the total number possible wavelength slots [floor(T/q)-ceiling($S_{rt}^{km}/q$))+1] starting from which ceiling($S_{rt}^{km}/q$) consecutive wavelength slots can be mapped. After evaluating combinations of all potential routes and modulation formats, the procedure selects a route and modulation format those maximize $P_{rt}^{km}$. If $P_{rt}^{km}$ is 0, then the procedure cannot map the VL on any of the routes using any of the modulation formats, and blocks the cloud demand after releasing all the pre-allocated resources. On the other hand, if is $P_{rt}^{km}$ nonzero, then the procedure finds the lowest wavelength slot starting from which ceiling($S_{rt}^{km}/q$) consecutive wavelength slots are available for the selected modulation format m and route k, and provisions the VL at the found wavelength slots on the selected route k and modulation format m between r and t PNs. Once the VL is mapped, the procedure maps the VNs at the both ends of the VL. The resources related to VN i are assigned to the PN r if r is not already mapped. Similarly, the resources related to VN j are assigned to the PN t if t is not already mapped. Finally, the procedure checks whether all VLs are provisioned or not. If at least one of the VLs is not yet provisioned, then the procedure repeats the procedure until all VLs are provisioned.

Figure 2:
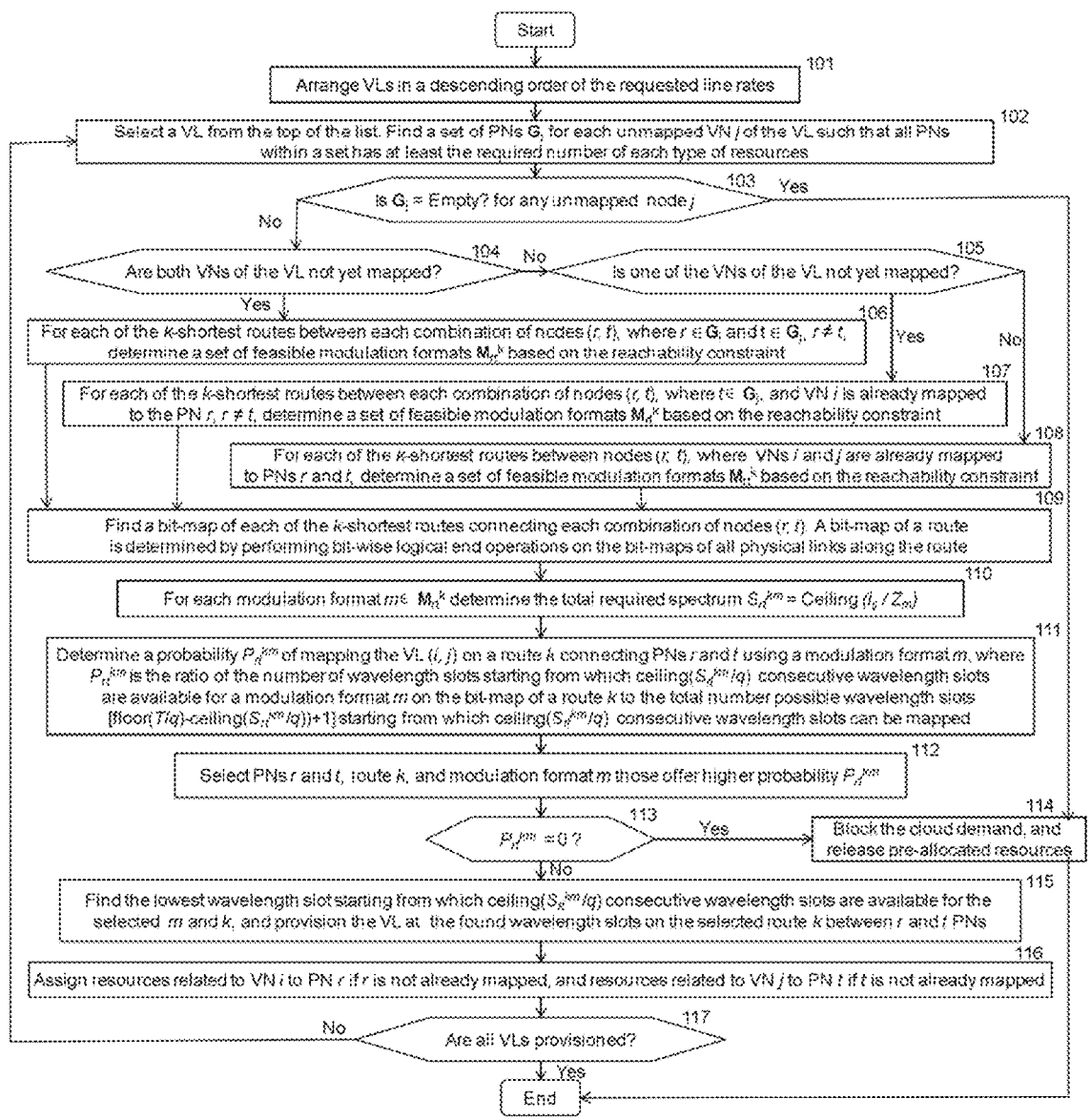
FIG. 2 is a block diagram detailing the network followed by compute load balancing, in accordance with the invention.

The flow chart of the invention is shown in the diagram of FIG. 2.

101: The procedure arranges VLs in a descending order of the requested line rates.

102: The procedure selects a VL from the top of the list, and finds a set of PNs $G_j$ for each unmapped VN j of the VL such that all PNs within a set has at least the required number of each type of resources.

103: The procedure checks whether $G_j$ is empty. If $G_j$ is empty, then the procedure follows Step 114, otherwise the procedure follows Step 104.

104: The procedure checks whether both VNs of the VL are not yet mapped. If both the VNs of the VL are not yet mapped, then the procedure follows Step 106. On the other hand, if at least one of the VNs is already mapped, then the procedure follows Step 105.

105: The procedure checks whether one of the VNs is already mapped while the other is not yet mapped. If this is true, then the procedure follows Step 107, otherwise, the procedure follows Step 108.

106: For each of the k-shortest routes between each combination of nodes (r, t), where r∈$G_i$ and t∈$G_j$, r≠t, the procedure determines a set of feasible modulation formats $M_{rt}^k$ based on the reachability constraint.

107: For each of the k-shortest routes between each combination of nodes (r, t), where t∈$G_j$, and VN i is already mapped to the PN r, r≠t, the procedure determines a set of feasible modulation formats $M_{rt}^k$ based on the reachability constraint.

108: For each of the k-shortest routes between nodes (r, t), where VNs i and j are already mapped to PNs r and t, the procedure determines a set of feasible modulation formats $M_{rt}^k$ based on the reachability constraint.

109: The procedure finds a bit-map of each of the k-shortest routes connecting each combination of nodes (r, t). A bit-map of a route is determined by performing bit-wise logical end operations on the bit-maps of all physical links along the route.

110: The procedure determines the total required spectrum $S_{rt}^{km}$=Ceiling ($l_{ij}/Z_m$) for each modulation format m∈$M_{rt}^k$.

111: The procedure determines a probability $P_{rt}^{km}$ of mapping the VL (i, j) on a route k connecting PNs r and t using a modulation format m, where $P_{rt}^{km}$ is the ratio of the number of wavelength slots starting from which ceiling($S_{rt}^{km}/q$) consecutive wavelength slots are available for a modulation format in on the bit-map of a route k to the total number possible wavelength slots [floor(T/q)-ceiling($S_{rt}^{km}/q$))+1] starting from which ceiling($S_{rt}^{km}/q$) consecutive wavelength slots can be mapped.

112: The procedure selects PNs r and t, route k, and modulation format m those offer higher probability $P_{rt}^{km}$.

113. The procedure checks whether $P_{rt}^{km}$ is 0. If it is, then the procedure follows Step 114, otherwise it follows Step 115.

114: The procedure blocks the cloud demand, and releases all the pre-allocated node and link resources.

115: The procedure finds the lowest wavelength slot starting from which ceiling($S_{rt}^{km}/q$) consecutive wavelength slots are available for the selected m and k, and provision the VL at the found wavelength slots on the selected route k between r and t PNs.

116. The procedure assigns resources related to VN i to PN r if r is not already mapped, and resources related to VN j to PN t if t is not already mapped.

117: The procedure checks weather all VLs are mapped. If at least on the VLs is not yet mapped, then the procedure repeats step 102, otherwise it terminates.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

Figure 3:
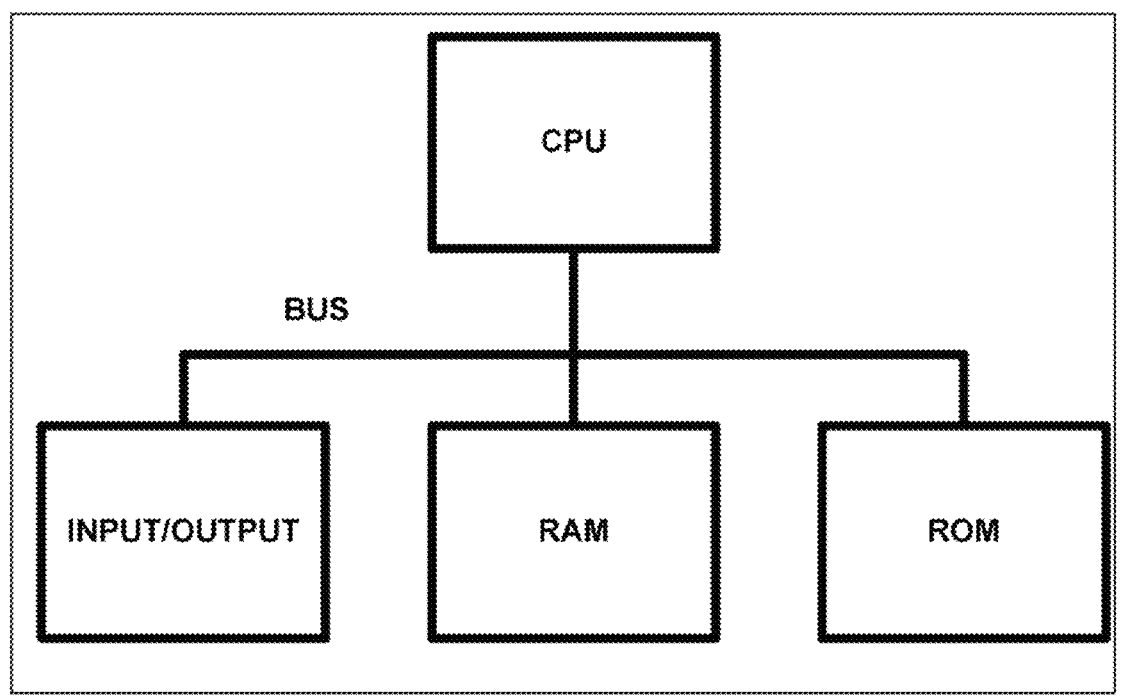
FIG. 3 shows an exemplary computer configuration to perform the invention.

By way of example, a block diagram of a computer to support the system is discussed next in FIG. 3. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing it can be appreciated that the key features of invention enable embedding the maximum number of cloud demands, applicability in the optical control plane, such as Path Computation Element (PCE) and as an application in a software-defined controller, and embedding cloud demands within practical time limits, and thus enhance software defined transport optical network performance.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method comprising the steps of:
   implementing by a computer an embedding of cloud demands over a software defined flexible grid optical transport network, the implementing comprising:
   initially mapping virtual links over physical links in the network;
   finding potential modulation formats and routing solutions for a virtual link mapping;
   selecting a modulation format and a physical routing solution for a virtual link based on a probability of mapping the virtual link over the route using the modulation format;
   assigning a wavelength and allocation spectrum to a virtual link such that spectral fragmentation is minimized thereby improving likelihood of mapping virtual links over physical routes; and
   mapping virtual nodes over physical nodes which includes assigning virtual nodes associated with the mapped virtual link to the end of physical nodes of a selected route on which the virtual link is mapped;
   wherein the step of assigning a wavelength comprises finding a lowest wavelength slot starting from which consecutive wavelength slots are available and provisioning the virtual link VL at found wavelength slots on a selected route between physical nodes PNs.

2. The method of claim 1, wherein the selecting step comprises selecting a virtual link VL from a list of virtual links, and finding a set of physical nodes PNs for each unmapped virtual node VN of the VL such that all PNs within a set have at least the required number of each type of resources.

3. The method of claim 2, wherein the step of finding comprises checking whether both virtual nodes VNs of the virtual VL are not yet mapped, and if both the VNs of the VL are not yet mapped, then for each of k-shortest routes between each combination of nodes there is a determination of a set of feasible modulation formats based on a reachability constraint, on the other hand, if at least one of the VNs is already mapped, then there is a checking of whether one of the VNs is already mapped while the other is not yet mapped and if this is true, then for each of the k-shortest routes between each combination of nodes where the VN is already mapped to the PN there is a determination of a set of feasible modulation formats based on the reachability constraint, otherwise, for each of the k-shortest routes between nodes where VNs are already mapped to PNs, there is a determination of a set of feasible modulation formats based on the reachability constraint.

4. A method comprising the steps of:
   implementing by a computer an embedding of cloud demands over a software defined flexible grid optical transport network, the implementing comprising:
   initially mapping virtual links over physical links in the network;
   finding potential modulation formats and routing solutions for a virtual link mapping;
   selecting a modulation format and a physical routing solution for a virtual link based on a probability of mapping the virtual link over the route using the modulation format;
   assigning a wavelength and allocation spectrum to a virtual link such that spectral fragmentation is minimized thereby improving likelihood of mapping virtual links over physical routes; and
   mapping virtual nodes over physical nodes which includes assigning virtual nodes associated with the mapped virtual link to the end of physical nodes of a selected route on which the virtual link is mapped;
   wherein the step of selecting a modulation format comprises finding a bit-map of each of k-shortest routes connecting each combination of nodes, with a bit-map of a route being determined by performing bit-wise logical end operations on bit-maps of all physical links along the route.

5. The method of claim 4, wherein the step of selecting further comprises determining a total required spectrum for each modulation format and determining a probability of mapping the virtual link on a route connecting physical nodes PNs using a modulation format taking into account a ratio of a number of wavelength slots starting from where consecutive wavelength slots are available for a modulation format on a bit-map of a route to a total number of possible wavelength slots starting from which consecutive wavelength slots can be mapped.

6. A system comprising:
implementation by a computer an embedding of cloud demands over a software defined flexible grid optical transport network, the implementation comprising:
initially mapping virtual links over physical links in the network;
finding potential modulation formats and routing solutions for a virtual link mapping;
selecting a modulation format and a physical routing solution for a virtual link based on a probability of mapping the virtual link over the route using the modulation format;
assigning a wavelength and allocation spectrum to a virtual link such that spectral fragmentation is minimized thereby improving likelihood of mapping virtual links over physical routes; and
mapping virtual nodes over physical nodes which includes assigning virtual nodes associated with the mapped virtual link to the end of physical nodes of a selected route on which the virtual link is mapped;
wherein the selecting step comprises selecting a virtual link VL from a list of virtual links, and finding a set of physical nodes PNs for each unmapped virtual node VN of the VL such that all PNs within a set have at least the required number of each type of resources;
wherein the step of finding comprises checking whether both virtual nodes VNs of the virtual VL are not yet mapped, and if both the VNs of the VL are not yet mapped, then for each of k-shortest routes between each combination of nodes there is a determination of a set of feasible modulation formats based on a reachability constraint, on the other hand, if at least one of the VNs is already mapped, then there is a checking of whether one of the VNs is already mapped while the other is not yet mapped and if this is true, then for each of the k-shortest routes between each combination of nodes where the VN is already mapped to the PN there is a determination of a set of feasible modulation formats based on the reachability constraint, otherwise, for each of the k-shortest routes between nodes where VNs are already mapped to PNs, there is a determination of a set of feasible modulation formats based on the reachability constraint.

7. The system of claim 6, wherein the step of selecting a modulation format comprises finding a bit-map of each of k-shortest routes connecting each combination of nodes, with a bit-map of a route being determined by performing bit-wise logical end operations on bit-maps of all physical links along the route.

8. The system of claim 7, wherein the step of selecting further comprises determining a total required spectrum for each modulation format and determining a probability of mapping the virtual link on a route connecting physical nodes PNs using a modulation format taking into account a ratio of a number of wavelength slots starting from where consecutive wavelength slots are available for a modulation format on a bit-map of a route to a total number of possible wavelength slots starting from which consecutive wavelength slots can be mapped.

9. The system of claim 6, wherein the step of assigning a wavelength comprises finding a lowest wavelength slot starting from which consecutive wavelength slots are available and provisioning the virtual link VL at found wavelength slots on a selected route between physical nodes PNs.

* * * * *